(12) United States Patent
Hoff

(10) Patent No.: US 7,831,465 B2
(45) Date of Patent: Nov. 9, 2010

(54) SALES REPRESENTATIVE WORKBENCH WITH ACCOUNT-BASED INTERFACE

(75) Inventor: Roland Hoff, Walldorf (DE)

(73) Assignee: SAP AG, Walldorf (DE)

( * ) Notice: Subject to any disclaimer, the term of this patent is extended or adjusted under 35 U.S.C. 154(b) by 609 days.

(21) Appl. No.: 11/590,217

(22) Filed: Oct. 31, 2006

(65) Prior Publication Data

US 2008/0195429 A1   Aug. 14, 2008

(51) Int. Cl.
G06F 11/34    (2006.01)
G07B 17/00    (2006.01)
G06Q 10/00    (2006.01)

(52) U.S. Cl. .............................. 705/11; 705/30; 705/1
(58) Field of Classification Search ................ 705/11, 705/30, 1
See application file for complete search history.

(56) References Cited

U.S. PATENT DOCUMENTS

| 6,871,232 | B2 | 3/2005 | Curie et al. |
| 7,430,410 | B2 | 9/2008 | Iwatsu et al. |
| 2003/0009536 | A1 | 1/2003 | Henderson et al. |
| 2005/0108041 | A1* | 5/2005 | White .............................. 705/1 |
| 2007/0226032 | A1 | 9/2007 | White et al. |
| 2007/0282650 | A1* | 12/2007 | Jackness et al. ................. 705/7 |
| 2007/0283287 | A1* | 12/2007 | Taylor et al. ................. 715/769 |
| 2008/0319777 | A1 | 12/2008 | Hoff |

FOREIGN PATENT DOCUMENTS

| EP | 1571541 A2 | 9/2005 |
| EP | 1635287 A1 | 3/2006 |

OTHER PUBLICATIONS

U.S. Appl. No. 60/811,359 (Jackness et al.) (11 pages).*
U.S. Appl. No. 60/811,359 (Jackness et al.), filed Jun. 5, 2006. (11 pages).*
European Office Action received for EP Application No. 07020243.7, mailed Oct. 16, 2009, 7 pages.
European Search Report for EP Application No. 07020243.7 mailed on Feb. 20, 2009, pp. 1-7.
European Office Action for EP Application No. 04020243.7, mailed Oct. 16, 2009, 7 pages.

(Continued)

*Primary Examiner*—James P Trammell
*Assistant Examiner*—Elda Milef
(74) *Attorney, Agent, or Firm*—Brake Hughes Bellermann LLP

(57) ABSTRACT

A computer program product for handling sales activity information, the computer program product being tangibly embodied on a computer-readable medium and including executable code that, when executed, is configured to cause a data processing apparatus to provide a sales activity interface. The sales activity interface may include a grouped plurality of fields that are grouped with respect to a customer account of a sales representative. The grouped plurality of fields may include an account name field configured to identify the customer account, a contact field configured to provide contact information associated with a contact between the sales representative and the customer account, and one or more customer value indication fields configured to provide one or more value metrics associated with the customer account.

19 Claims, 6 Drawing Sheets

OTHER PUBLICATIONS

Extended European Search Report for EP Application No. 07020243.7, mailed Feb. 20, 2009, 7 pages.
Non-Final Office Action for U.S. Appl. No. 11/590,217, mailed Jun. 10, 2009, 22 pages.
Non-Final Office Action Response for U.S. Appl. No. 11/590,217, filed Sep. 11, 2009, 18 pages.
U.S. Appl. No. 11/590,217, filed Oct. 31, 2006, 46 pages.
U.S. Appl. No. 11/809,513, filed Jun. 1, 2007, 37 pages.
Final Office Action Response and RCE for U.S. Appl. No. 11/590,217, filed May 4, 2010, 10 pages.
U.S. Appl. No. 12/609,750, filed Oct. 30, 2009, 49 pages.
U.S. Appl. No. 12/343,163, filed Dec. 23, 2008, 26 pages.
U.S. Appl. No. 12/347,720, filed Dec. 31, 2008, 29 pages.
Final Office Action for U.S. Appl. No. 11/590,217, mailed Jan. 7, 2010, 25 pages.
Non-Final Office Action for U.S. Appl. No. 11/820,701, mailed Aug. 19, 2010, 15 pages.

* cited by examiner

SALES REPRESENTATIVE WORKBENCH WITH ACCOUNT-BASED INTERFACE

TECHNICAL FIELD

This description relates to a sales representative workbench.

BACKGROUND

The management of relationships between customers and sales representatives is integral to a success of the sales representatives, and, ultimately, to an underlying enterprise. However, when a sales representative has many, e.g., hundreds or even thousands, of customers for whom the sales representative may be responsible, managing the sales representative's relationships with each customer may be a very time-consuming and inefficient task.

Also, a sales manager of the sales representative may need a way to manage the sales representatives for whom the sales manager is responsible. The sales manager may need to review the relationships of the sales representatives with their customers and provide feedback on the relationships. Since a given sales manager may be responsible for a number of sales representatives, a number of customer accounts for which each sales manager is responsible is even larger, and thus more difficult, for the sales manager to track and coordinate.

Consequently, it may be difficult or impossible for a sales representative to manage customer accounts in an optimal manner. For example, the sales representative may attend to less-profitable customers at the expense of potentially more profitable customers, or may ignore certain customers altogether. Moreover, to the extent that it is difficult for a sales manager to track customers of all supervised sales representatives, the sales representatives lose the benefit of the insight of the sales manager. As a result, the success of the sales representative, and of the underlying enterprise, may suffer.

SUMMARY

Various embodiments of a sales representative workbench with an account based interface are disclosed. According to an example embodiment, a computer program product for handling sales activity information is disclosed. The computer program product is tangibly embodied on a computer-readable medium and includes executable code that, when executed, is configured to cause a data processing apparatus to provide a sales activity interface. The sales activity interface includes a grouped plurality of fields that are grouped with respect to a customer account associated with a sales representative. The grouped plurality of fields include an account name field configured to identify the customer account, a contact field configured to provide contact information associated with a contact between the sales representative and the customer account, and one or more customer value indication fields configured to provide one or more value metrics associated with the customer account.

According to another example embodiment, a customer relationship management system includes a customer relationship manager server configured to provide a sales workbench system for use by a sales representative is disclosed. The sales workbench system includes an account manager configured to access account information for customer accounts associated with the sales representative, a contact manager configured to access contact information for each of the customer accounts, the contact information including past and future contacts between the sales representative and the customer account, a sales manager configured to access sales data for each of the customer accounts, the sales manager including an aggregator configured to aggregate the sales data for each of the customer accounts over a time period, a view generator configured to generate a sales activity interface in which the contact information and the sales data for each customer account are grouped and presented with respect to their respective customer account, and an account value manager configured to prioritize the customer accounts within the sales activity interface according to a relative value of each customer account to the sales representative.

According to another example embodiment, a method of providing a sales activity interface is disclosed. The method includes accessing account information for a plurality of customer accounts associated with a sales representative, accessing contact information for each of the plurality of customer accounts, the contact information including past and future contacts between the sales representative and the customer accounts, accessing sales data for each of the plurality of customer accounts, the sales data including aggregated sales data for each of the customer accounts over a time period, generating the sales activity interface in which the contact information and the sales data for each customer account are grouped and presented with respect to their respective customer account; and prioritizing the customer accounts within the sales activity interface according to a relative value of each customer account to the sales representative.

The details of one or more implementations are set forth in the accompanying drawings and the description below. Other features will be apparent from the description and drawings, and from the claims.

DETAILED DESCRIPTION

Figure 1:
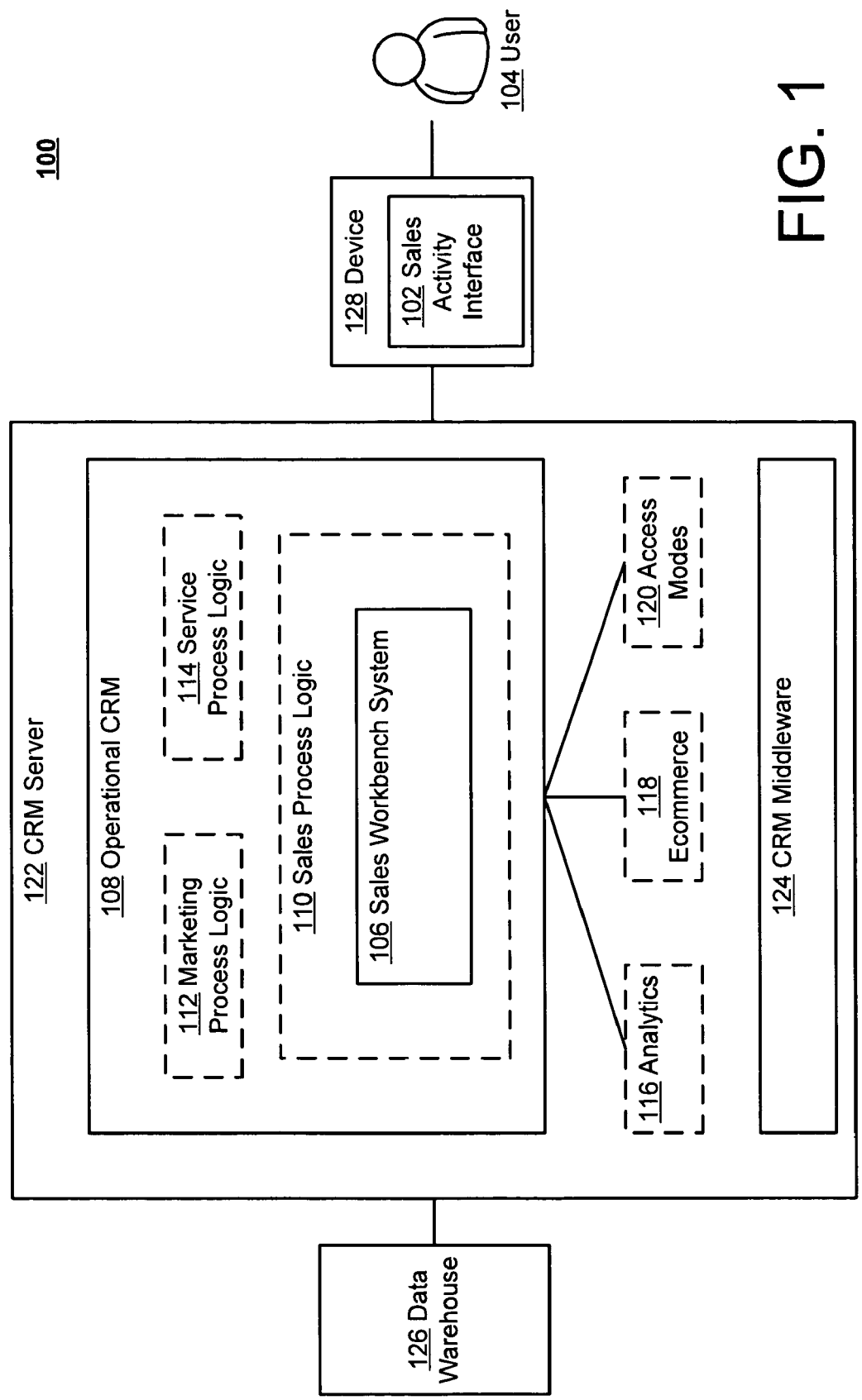
FIG. 1 is a block diagram of an example system for a sales representative workbench with account-based interface of a customer relationship management (CRM) system.

FIG. 1 is a block diagram of an example system 100 for a sales representative workbench of a customer relationship management (CRM) system. In the example of FIG. 1, the system 100 allows a sales representative to manage multiple customer accounts through an account-based sales activity interface 102 of the customer relationship management (CRM) system. For example, the sales representative may view his or her customer accounts and/or potential future customer accounts, including, for example, data associated with the customer accounts that the sales representative may find useful in evaluating and/or prioritizing the customers accounts in order to determine what actions her or she should take in order to generate a greater likelihood of increased sales from the customer accounts.

The sales representative may use the data to perform a value-driven prioritization of the customer accounts, based, for example, on customer relationship management documents, such as sales transaction documents. The sales transaction documents, for example, may include realized sales transaction documents, or pipeline transaction documents, including, e.g., information pertaining to sales orders, service orders, opportunities, quotations, contracts and/or leads. For example, in performing a value-driven prioritization, the sales representative may be able to sort, filter, prioritize and/or categorize the customer accounts based on any number of criteria; including but not limited to, the account name, past and future contacts between the sales representative and the customer account, and sales data including total customer sales volume, realized sales orders, and expected or potential sales. This may allow the sales representative to quickly and efficiently manage the customer accounts and determine which customer accounts the sales representative should pay special attention to and/or contact. In example embodiments, as described in more detail below, the value-driven prioritization may be driven by a customer's total sales opportunities, and actual and potential sales between the customer and the sales representative.

As just referenced, the sales activity interface 102 may display information regarding, and organized with respect to, multiple customer accounts of a sales representative. For example, the sales activity interface 102 may display information for each of hundreds of customer accounts of a user 104 (or selected ones thereof). In an example embodiment, the sales activity interface 102 may be callable from a sales representative homepage that is personalized to the user 104, or may be otherwise accessible using the system 100. The sales activity interface 102 is discussed in greater detail below in association with FIG. 2, and in accordance with various example embodiments.

The user 104 may represent, for example, a user of the sales activity interface 102. For example, the user 104 may be a sales representative who may use the sales activity interface 102 to view or manage his or her customer accounts, including potential future customers. In other example embodiments, the user 104 may be sales manager who may use the sales activity interface 102 to view or manage the customer accounts of one or more sales representatives whom the sales manager may be managing.

The sales activity interface 102 may be associated with, and/or provided by, a sales workbench system 106. The sales workbench system 106 may be configured to manage and provide sales information and other information useful to the user 104, in a way that is easily accessible by, and useful to, the user 104. For example, sales workbench system 106, perhaps in conjunction with other CRM components) may manage a sales representative's interactions with customers (e.g., personal interaction, letter, fax, phone, Internet, and/or e-mail). The sales workbench system 106 may allow the user 104 to sort, filter, prioritize and/or categorize the customer account information displayed on the sales activity interface 102. For example, a sales representative may sort through the customer accounts to determine which customer the sales representative should visit on his or her next business trip. In another example embodiment, the sales workbench system 106 may allow additional and/or different forms of information management, as well. Examples of the sales workbench system 106 are discussed in greater detail below in association with FIG. 2.

The sales workbench system 106 may be part of a customer relationship management (CRM) system, which may include operational CRM 108. Operational CRM 108 may be used, for example, to automate various business processes, or to otherwise provide automated support of various aspects of customer relationship management. For example, operational CRM 108 may provide automated support for sales, marketing, and service for a business or businesses through sales process logic 110, marketing process logic 112, and service process logic 114, respectively.

In more specific examples, the sales process logic 110 may automate and/or provide information about sales and sales force management tasks. For example, sales process logic 110 may automate or provide information about predicting future sales, providing administrative sales support, or maintaining customer-specific information. In the example embodiment of FIG. 1, the sales process logic 110 includes the sales workbench system 106, as shown.

Somewhat similarly, the marketing process logic 112 may automate and/or provide information about marketing. For example, the marketing process logic 112 may automate or provide information about current marketing trends, or may support implementation of a current marketing plan. For example, the marketing process logic 112 may conduct surveys, send e-mails or other communications to customers regarding a current marketing plan, or coordinate with marketing service providers to implement a marketing plan therewith.

The service process logic 114 may automate and/or provide information about services provided to customers as part of a sale or other interaction with the customers. For example, the service process logic 114 may automate and/or provide information about customer complaints or requests, or may provide technical or other support to customers, or may handle customer exchanges or refunds.

Thus, the operational CRM 108 provides support and assistance for identifying current or potential customers, executing sales to the customers, and then providing assistance to the customers in support of the executed sales. In other words, the operational CRM 108 facilitates present and future interactions between an enterprise (including the user 104) and its customers. Consequently, although not specifically or separately illustrated in FIG. 1, the operational CRM 108 may include, or be associated with, collaborative CRM, which may provide and manage a number of different communication techniques (e.g., e-mail, telephone, or other interactions) between the sales representative or other user 104 and a given customer(s). Thus, such collaborative CRM facilitates interactions, or collaborations, between various associated entities (e.g., between sales representatives and customers, between service providers and customers, and/or between marketing professionals/campaigns and customers)

As appreciated from the above description, the operational CRM 108 thus may be used to establish, maintain, and grow customers over a lifetime of the enterprise. In this regard, the operational CRM 108 may be assisted by other CRM features, e.g., analytics 116, ecommerce 118, and access modes 120.

The analytics 116, for example, may analyze data gathered by the operational CRM 108 (or by components thereof), or relevant data that is otherwise available, in order to improve or enhance customer relationships. For example, the analytics 116 may analyze data gathered by the sales process logic 110 and provide this information to the user 104 through the sales activity interface 102 (e.g., to identify new customers, increase profitability, or otherwise facilitate the job of the user 104). Similarly, the analytics 116 may analyze data associated with a marketing campaign of the marketing process logic 112. The analytics 116 also may provide support to the service process logic 114, e.g., by analyzing a success rate of a customer call center, or by tracking a number of returns of a sold product.

Ecommerce 118 may provide a way to manage a company's electronic commerce and/or internet interactions. For example, ecommerce 118 may manage the sales process logic 110 when customers purchase merchandise using a website of the enterprise, or using affiliate websites.

The access modes 120 may provide various views of a CRM processes depending on which user may be trying to access the system. For example, the access mode 120 may provide a first view of the sales activity interface 102 when the user 104 is a sales representative, and the access mode 120 may also provide a second view of the sales activity interface 102 when the user 104 is a sales manager.

The operational CRM 108, including the analytics 116, ecommerce 118, and the access modes 120 may all run off of a CRM server 122. The CRM server 122 may provide some or all of the customer relationship management (CRM) system referenced herein to other computing systems over a network. For example, the CRM server 122 may use CRM middleware 124 to provide CRM sales data from a data warehouse 126 to the operational CRM 108 for processing (e.g. by the sales processing logic 110 and/or the sales workbench system 106), and then to the device 128 for display on the sales activity interface 102.

The CRM middleware 124 may connect software components, devices and/or applications, including distributed applications and back-end or legacy applications. For example, the CRM middleware 124 may connect the CRM server 122 or operational CRM 108 to the data warehouse 126. The CRM middleware 124 may also for example, allow the sales activity interface 102 to interact with the data warehouse 126 through the operational CRM 108. The CRM middleware 124 may implement an appropriate messaging infrastructure, or other integration services or capabilities, as needed.

The data warehouse 126 may represent one or more of a database, memory or other storage device(s) containing information related to the CRM system. For example, the data warehouse 126 may contain customer account information, contact information, and sales information that may be managed by the sales workbench system 106 and displayed in the sales activity interface 102 which may run on the device 128. In another example embodiment, the CRM information may be stored in multiple (types of) data warehouses 126, which may communicate with the CRM server 122.

The device 128 may be any device configured to display and/or interact with a CRM system. For example, the device 128 may be a personal digital assistant (PDA), mobile phone, laptop, desktop computer or other device capable of communicating with the CRM server 122 and allowing a user 104 to interact with the sales activity interface 102. In another example embodiment, multiple devices 128 may communicate with the CRM server 122.

The above description provides example implementations of a CRM system. It will be appreciated that many other features and functions may be included in such a CRM system than may be described here in detail. Further, the illustrated CRM system and system components may interact in any known or acceptable manner, e.g., using an underlying application platform. Thus, the various illustrated components may be combined, or may communicate with one another, in any acceptable or desired fashion. For example, the analytics 116, or component(s) thereof, may be considered to be part of (components of) the operational CRM 108, such as when the marketing process logic 112 includes analytics for analyzing a customer response to a previous marketing campaign.

Figure 2:
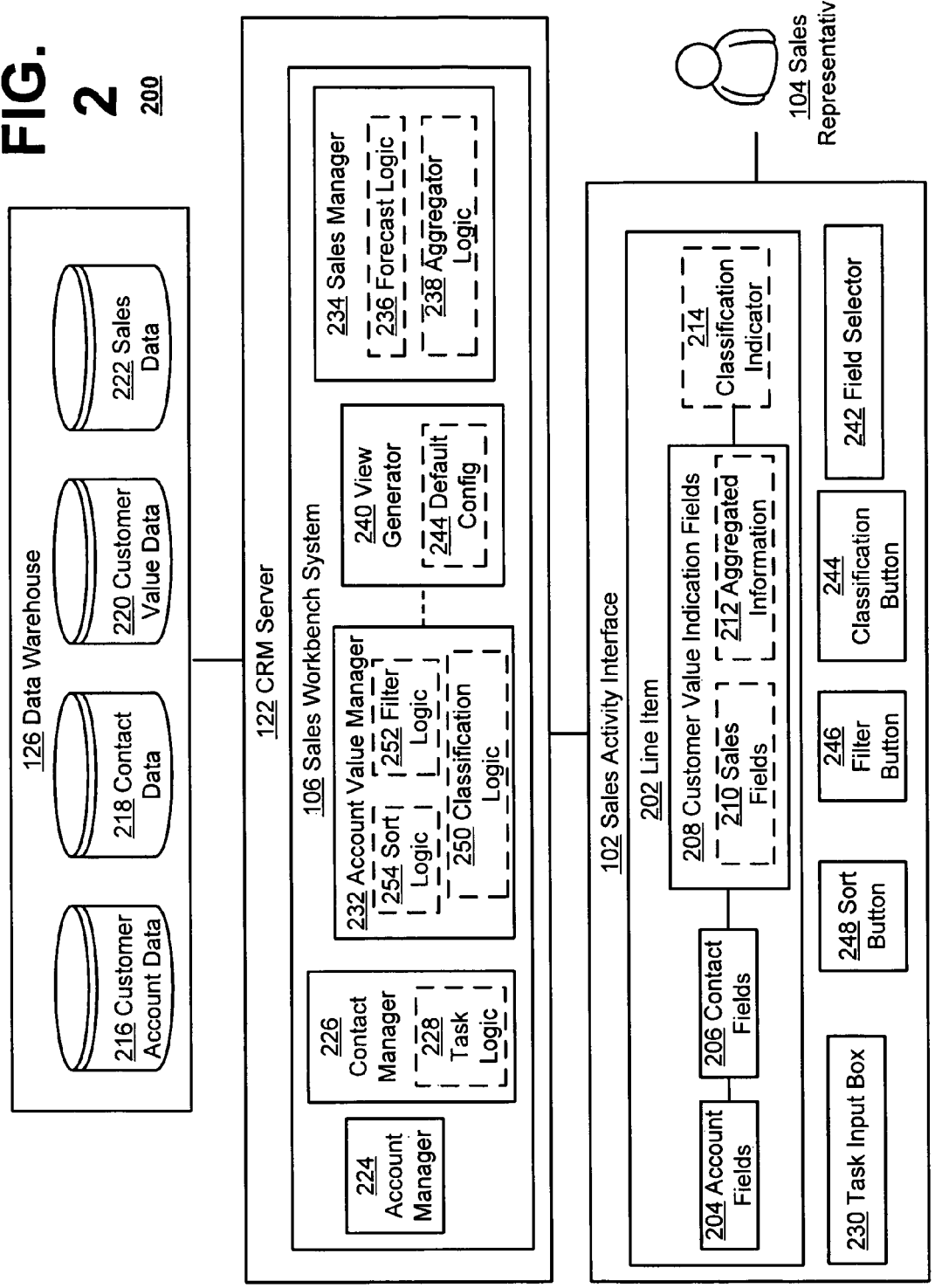
FIG. 2 is a block diagram of an example system for the sales representative workbench with account-based interface of FIG. 1, including a sales activity interface of FIG. 1.

FIG. 2 is a block diagram of an example system 200 for the sales representative workbench 106 of FIG. 1. The system 200 may include, or provide, the sales activity interface 102 operated by the user 104. In the following description, the user 104 is also referred to explicitly as the sales representative 104, although it will be appreciated that other users, as referenced above, may use the sales activity interface 102 (e.g., a sales manager).

The sales representative 104, as referenced above, may be a user of a sales system who has multiple customer accounts to manage. For example, the sales representative 104 may use the sales activity interface 102 to view the customer accounts associated with the sales representative 104. In an example embodiment, the sales representative 104 may have hundreds of customer accounts to manage. In another example embodiment, the sales representative 104 may be a sales manager or other sales-associated user who may use system 200 to review customer account information regarding one or more sales representatives.

The sales activity interface 102 may display information regarding multiple customer accounts and/or potential future customers of a sales representative. For example, the sales activity interface 102 may display a line item 202 containing information regarding a customer account of the sales representative 104. The sales activity interface 102 may allow a user to manage multiple customer accounts associated with the sales representative 104. For example, the sales representative 104 may filter, sort, prioritize, categorize or otherwise manage the line items 202 (and thus individual customer accounts) of the sales activity interface 102, relative to one another. That is, the sales activity interface 102 may include multiple line items 202, wherein each line item 202 may correspond to a different customer account of the sales representative 104.

Line item 202 may thus include a grouping of various related fields of data. For example, line item 202 may include multiple fields of data all associated with a specific customer account of the sales representative 104. In an example embodiment, line item 202 may include account field(s) 204, contact field(s) 206, customer value indication field(s) 208 including sales field(s) 210 and aggregated information 212, and a classification indicator 214.

In the example of FIG. 2, the various fields are organized with respect to the individual customer accounts and within the line item(s) 202. In other example embodiments, the grouping of the various fields relative to their respective, individual customer accounts may occur on the sales activity interface 102 in a format other than a line (e.g., each customer account field(s) 204 may be at a center of its related fields).

The account fields 204 may be one or more fields of information configured to display general information about a customer account. For example, account fields 204 may include an account name field, or a field for a specific person at the customer with whom the sales representative 104 normally interacts. In other example embodiments, the account fields 204 may include other account information as well, such as, for example, a number of employees of the customer, the industry to which the customer belongs, and a length of time that the customer has been a customer of the sales representative. Not all such account information need be explicitly included in the account fields 204 within the sales activity interface 102. For example, the account field(s) 204 may include a selectable hyperlink that the sales representative 104 may select to access the information just referenced, perhaps in a separate screen/interface.

The contact fields 206 may be one or more fields of information configured to display information regarding contacts between the sales representative 104 and a customer account. For example, the account fields 204 may include a last contact field and a next contact field for a last and a scheduled interaction between the sales representative 104 and the customer account associated with the line item 202. In an example embodiment, the contact fields 206 may describe a main contact person, the time of the contact, the time since the last contact or until the next scheduled contact, and/or the type of contact (such as, e-mail, phone call, or personal meeting). In an example embodiment, the contact fields 206 may be aggregated into time periods, such as the number of contacts over the past year. In another example embodiment, the contact fields 204 may include other contact information as well. As with the account fields) 204, some of the above-referenced contact information, or other contact information, may be accessible by way of a selectable hyperlink within the contact field(s) 206.

The customer value indication fields 208 may be one or more fields of information configured to help the sales representative make a value determination regarding a customer account. For example, the customer value indication fields 208 may include sales fields 210, aggregated information 212, and/or other fields. In an example embodiment, the sales representative 104 may choose which customer value indication fields 208 the sales representative 104 wants displayed within the sales activity interface 102.

The sales fields 210 may be one or more fields of information configured to display information regarding sales associated with the sales representative 104 and/or a specific customer account. For example, the sales fields 210 may include actual sales data of sales between the sales representative 104 and the specific customer account, an expected sales volume concerning future or potential sales between the sales representative 104 and the customer account, and/or a chance of success for the sales representative 104 to achieve the future or potential sales. In an example embodiment, the sales fields 210 may include other sales information as well.

The aggregated information 212 may include one or more fields of information configured to display aggregated information over a period of time. For example, aggregated information 212 may display aggregated information regarding the customer value indication fields 208, including the sales fields 210 over a period of time that may be specified by the sales representative 104. For example, the aggregated information 212 may include past actual sales data for sales between the sales representative 104 and the customer account broken down by month, quarters, and/or years for the past two years. The aggregated information 212 may also include projected sales, e.g., broken down by quarter for the next 6 months (where such projections may later be compared to actual sales over the same time period, e.g., to test an accuracy of the projections). In an example embodiment, the aggregated information 212 may include aggregated information for each of a plurality of the line items 202 of the sales activity interface 102, displayed in association with respective ones of the line items 202.

The classification indicator 214 may be an indication of a value, priority and/or categorization of a customer account. For example, the sales representative 104 may want to give priority to customer accounts with a next scheduled contact scheduled for less than 3 days from the current date. Then for example, when a next scheduled contact for a customer account is 3 days away, classification indicator 214 may bold, change the color of, underline, italicize, play a sound, indicate in a field, or perform some other indication on the line item 202 to indicate that the customer account associated with the line item 202 has reached priority status. In another example embodiment, the classification indicator 214 may indicate a classification of a customer account or a group of customer accounts. For example, all customer accounts for current customers without any current opportunities may be displayed in blue, or may otherwise be highlighted.

In an example embodiment, the sales activity interface 102 may include multiple line items 202 (each line item 202 corresponding to a separate customer account of the sales representative 104), wherein the sales activity interface 102 may interact with a sales workbench system 106 to manage the line items 202. In this way, the line items 202, and thus the respective customer accounts, may be arranged relative to one another in a way that provides an indication of priority of each customer to the sales representative 104.

Thus, the sales workbench system 106 may manage sales and/or other customer relationship management information. For example, as just described, the sales workbench system 106 may manage the line items 202 of the sales activity interface, wherein the line items 202 correspond to customer accounts for the sales representative 104. The sales workbench system 106 may include multiple components involved in the management of sales information. The sales workbench system may run on the CRM server 122, which may communicate with the data warehouse 126, as shown.

The CRM server 122, or components thereof, may serve as a communication medium between different systems or devices. For example, the CRM server 122 may retrieve information from the data warehouse 126, provide the information to the sales workbench system 106 (which may be running on the CRM server 122), and associate the sales workbench system 106 with the sales activity interface 102. In an example embodiment, the CRM server 122 may include software and/or hardware configured to read information from the data warehouse 126 and provide the information to the sales workbench system 106 and the sales activity interface 102.

As described above, the data warehouse 126 may be a database, memory or other storage device containing information related to a CRM system. For example, the data warehouse 126 may contain customer account data 216, contact data 218, customer value data 220, and sales data 222 that may be managed by the sales workbench system 106 and displayed in sales activity interface 102. In an example embodiment, the data warehouse 126 may include data related to one or more customer accounts associated with the sales representative 104. In another example embodiment, the data warehouse 126 may include other types of data regarding multiple customer accounts and/or multiple sales representatives 104.

The customer account data 216 may be data or information regarding one or more customer accounts associated with the sales representative 104. For example, the customer account data 216 may include a customer's name, size, client number, location, industry and/or any other information pertaining generally to a customer account. The customer account data may for example appear in, or may be accessible by way of, the account fields 204 of the sales activity interface 102.

The contact data 218 may be data or information regarding contacts or interactions between the sales representative 104 and a customer account. For example, the contact data 218 may include a client number or customer name, persons of interest, type of contact, time of contact, scheduled contacts, recommended contacts, tasks, and/or any other information pertaining to a past contact or potential contact between the sales representative 104 and the customer account. The contact 218 may, for example, appear in the contact fields 206 of the sales activity interface 102.

The customer value data 220 may be data or information regarding a customer account's value to the sales representative 104. For example, the customer value data 220 may include customer account transfer information (e.g. if the customer account was transferred to the sales representative 104 from a previous sales representative), potential and/or actual product information for the customer account, rejected products, and/or any other information the sales representative 104 may find useful in determining how, when, or whether to contact (a representative of) the customer account. The customer value data 220 may, for example, appear in the customer value indication fields 208 of the sales activity interface 102.

The sales data 222 may be data or information regarding sales between the sales representative 104 and a customer account. For example, the sales data 222 may include actual sales between the sales representative 104 and the customer account, potential and/or pipeline sales between the sales representative 104 and the customer account, customer account purchase history, an expected sales volume, any open sales opportunities, and/or any other sales related information pertaining to the sales representative 104 and the customer account. The sales data 222 may, for example, appear in the sales fields 210 of the sales activity interface 102.

It will be appreciated that the illustrated structure of the data warehouse 126 is merely a non-limiting example, and that other data organization schemes are contemplated as well. For example, as appreciated from the discussion below, some or all of the sales data 222 and/or the contact data 218 may be considered to be customer value data 220, so that the customer value data 220 need not be stored as a separate element.

In an example embodiment, the information stored in the data warehouse 126, including the customer account data 216, the contact data 218, the customer value data 220, and the sales data 222, may be managed and/or presented in the sales activity interface 102 by the sales workbench system 106. For example, the account manager 224 may manage or access (e.g. read from and write to) the customer account data 216.

More specifically, the account manager 224 may be configured to manage general account information regarding one or more customer accounts. For example, the account manager 224 may be configured to access the customer account data 216 regarding one or more customer accounts associated with the sales representative 104. In an example embodiment, the account manager 224 and/or the sales representative 104 may determine and/or select which of customer account data 216 to provide to the sales activity interface 102.

The contact manager 226 may be configured to manage contact information regarding contacts between a sales associate and one or more customer accounts. For example, the contact manager 226 may be configured to access the contact data 218 regarding contact between the sales representative 104 and one or more customer accounts. In an example embodiment, the contact manager 226 and/or the sales representative 104 may determine and/or select which of contact data 218 to provide to the sales activity interface 102.

The contact manager 226 may include task logic 228. The task logic 228 may be configured to manage tasks that may become action items, in regards to one or more customer accounts, for the sales representative 104. For example, a sales manager may review the customer account information of the sales representative 104 as displayed in the sales activity interface 102. Then, for example, the sales manager may notice that the sales representative 104 has not contacted a specific person of interest at company X regarding sales.

Consequently, the sales manager may enter a task for the sales representative 104 to contact the person of interest at company X by a specified date. In an example embodiment, the task may become a next or scheduled contact between the sales representative 104 and the customer account. The sales manager may create a task, for example, using the task input box 230 of the sales activity interface 102.

Thus, the task input box 230 may create a task for the sales representative 104 based on a user's input. In an example embodiment, the task input box 230 may include a sub-interface displayed in association with the sales activity interface 102, wherein the task input box 230 may include a subset and/or more detailed information regarding the line item 202 and an input field wherein a user may review the information of the task input box 230 and provide information regarding a task for the sales representative 104 to be handled by the task logic 228, as described above.

The account value manager 232 may be configured to assist the sales representative 104 in prioritizing, valuing, or otherwise managing one or more customer accounts. For example, the account value manager 232 may access the data warehouse 126 to prioritize, categorize, sort, filter or otherwise manage one or more line items 202 appearing in the sales activity interface 102. In an example embodiment, the account value manager 232 may work in association with one or more other components or managers of the sales workbench system 106. In another example embodiment, the account value manager 232 may include, or may interoperate with, an application or program that receives data from the sales workbench system 106, performs management operations on the data, and returns the managed information to the sales workbench system 106. For example, known table calculation programs may be used to perform actual sorting and filtering operations, based on information and criteria provided by the account value manager.

The sales manager 234 may manage sales information regarding sales between the sales representative 104 and one or more customer accounts. For example, the sales manager 234 may access the sales data 222 regarding information about sales between the sales representative 104 and one or customer accounts. In an example embodiment, the sales manager 234 and/or the sales representative 104 may determine and/or select which of sales data 222 to provide to the sales activity interface 102 in the sales fields 210, e.g., over a specified time period.

The sales manager 234 may include forecast logic 236. The forecast logic 236 may forecast or determine potential sales between an account representative and one or more customer accounts. For example, forecast logic 236 may determine, based at least in part on the sales data 222 and input from the sales representative 104 or other user, what is the expected volume of sales between the sales representative 104 and a customer account, what is the likelihood of success of achieving the sales, and/or other potential sales information. In an example embodiment, the sales representative 104 may have a signed contract with the customer account of line item 202 in the amount of $100 thousand. Then, for example, the forecast logic 236 may assign a 95% expectation value to signed contracts, to give the sales representative 104 an expected value of $95 thousand.

The sales manager 234 may also include aggregator logic 238. The aggregator logic 238 may aggregate sales and/or other value information over one or more time periods. For example, the aggregator logic 238 may aggregate the sales data 222 for sales between the sales representative 104 and a customer account by quarters over the past year. The aggregator logic 238 may also, for example, aggregate information received from the forecast logic 236. For example, the expected sales volume for the next two quarters may be aggregated. In an example embodiment, the aggregator logic 238 may aggregate information for multiple line items 202 that may appear in the sales activity interface 102. In another example embodiment, different fields may be aggregated over varying time periods. For example, past sales data may be aggregated over years, while expected sales data may be aggregated over months. The aggregated information from aggregator logic may be provided to the aggregated information 212 of the sales activity interface 102.

Thus, in example embodiments, it will be appreciated that a company or enterprise implementing the CRM system and employing the sales representative 104 may wish to provide forecasted earnings/sales projections, for use by external business partners (e.g., analysts or investors) in measuring a performance of the enterprise. Such forecasted earning results tend not to change, or to change infrequently. In example implementations, the forecast logic 236 may be involved in generating such external forecasts, although such external forecasts may be altered based on human estimation or needs.

As described herein, the forecast logic 236 also may provide a forecast value in association with expected and/or target sales for the sales representative 104. Consequently, the aggregator logic 238 may be used to aggregate such expected sales values for a number of sales representatives, which changes relatively frequently and may then be compared to the static, external forecast just referenced. In this way, for example, the static, external forecast may be compared against the aggregated, actual forecast, for the enterprise as a whole, or broken down by individual sales representatives.

For example, the forecast value may provide a pre-determined value representing an expected amount of sales the sales representative 104 is expected to generate over the next fiscal quarter (e.g., based on available sales data including opportunities, quotations, and contacts). Meanwhile, the aggregator logic 238 may determine an actual amount of sales generated over the current or previous quarter(s). Then, the just-referenced information may be used to provide a quantitative comparison between selected ones of actual, expected, and external (static) forecasts, which may be broken down by fiscal quarter or by any other desired time period. Thus, it may be easily determined whether alignment exists between the actual, expected, and (static) forecast sales data, or whether the sales representative 104 (or the enterprise as a whole) is meeting expectations. For example, the static forecast sales data may be presented in conjunction with the expected and or actual sales data for a quarter, and a visual indicator may be presented to notify the sales representative 104 as to whether goals are being reached.

The view generator 240 may generate an interface for a customer relationship management (CRM) system. For example, the view generator 240 may generate the sales activity interface 102, based in part on the information provided by the sales workbench system 106, including one or more of the account manager 224, the contact manager 226, the account value manager 232, and/or the sales manager 234. In an example embodiment, the sales activity interface 102 may include multiple line items 202, wherein the sales activity interface 102 and/or the line items 202 may be managed with the field selector 242, the classification button 244, the filter button 246 and/or the sort button 248.

The field selector 242 may determine or allow a user to determine which fields may be included in a sales interface. For example, the field selector 242 may allow the sales representative 104 to select which of the account fields 204, contact fields 205 and/or customer value indication fields 208 to include in the line item 202 of the sales activity interface 102. The field selector 204 may then provide the selected fields to the sales workbench system 106 for display by the view generator 240 onto the sales activity interface 102. In this way, the sales activity interface 102 may be presented to, and used by, the sales representative 104 in an interactive manner. As may be appreciated, the field selector 204, or similar element(s), may be used to select or provide classification fields from among possible classification fields, perhaps in conjunction with classification logic 250. For example, the various classification criteria discussed herein, and other example classification criteria, including customer size or a number of customer employees, may be selected and/or associated with the classification indicator 214.

In other example embodiments, the view generator 240 may include a default config 244. The default config 244 may be a default configuration of which fields are to be displayed on the sales activity interface 102. For example, the sales representative 104, using the field selector 242, may adjust the default config 244 to the sales representative's 104 own preferences (e.g., to show forecasted sales without including actual past sales).

In an example embodiment, the sales representative 104 may determine which fields may be displayed in the line items 202, and which line items 202 are to be displayed on the initial user login to the sales activity interface 102, and how those line items 202 are to be ordered. For example, the sales representative 104 may set the default config 244 to only display line items 202 for those customer accounts who have a total company sales volume of greater than $100 million and whose last contact was greater than seven days ago, where the resulting line items 202 should then be ordered from oldest last contact to newest last contact. Then, for example, when the sales representative 104 logs into the sales activity interface 102, only those line items 202 meeting the specified default config 244 may be displayed in accordance with the default config 244.

The classification button 244 may be a button (or other selector, field, icon, or menu item) appearing on an interface configured to allow a user to classify customer relationship management information. For example, the classification button 244 may allow the sales representative 104 to specify classification criteria that may be used to classify the line items 202 associated with the sales activity interface 102. For example, the classification criteria may be based on, or supplemental to, the account fields, such as grouping the line items 202 by customer industry, a size of the customer, or a number of the customer's employees.

In an example embodiment, the sales representative 104 may want to group the customer accounts into different categories or groups. For example, the sales representative 104 may want to organize customer accounts into three categories, such as current customers with sales in pipeline, current customers without current sales opportunities, and potential future customers. The line items 202 of the customer accounts may then include the classification indicator 214 to indicate the three categories of customer accounts. For example, classification indicator 214 may include the categories as being differentiated by color or other visual indicator.

In an example embodiment, the sales representative 104 may want to give customer accounts with a certain criteria a bell or priority status. For example, the sales representative 104 may use the classification button 244 to set a rule that all accounts with next contacts scheduled within 7 days whose potential sales volume for the next quarter exceeds $2 million dollars should be given a priority status. Then, for example, the line items 202 associated with the customer accounts that meet the rule criteria may appear with a bell or priority icon as the classification indicator 214. In an example embodiment, the classification button 244 may also provide for the review and/or maintenance of classifications. In other example embodiments, the classification button 244 need not be included for this purpose, and the sales representative may assign the priority status simply by clicking on or otherwise selecting a desired customer account or other field.

The classification of the customer accounts as determined by the classification button 244 may be handled by the classification logic 250. The classification logic 250 may classify the customer accounts of a sales representative based on classification criteria. The classification criteria may be based on any information accessible by the account value manager 232, including, for example, one or more of the customer account data 216, the contact data 218, the customer value data 220, and/or the sales data 222. The classification logic 250 may then cause the view generator 240 to display the classification indicator 214 with respect to those customer accounts meeting the classification criteria.

The filter button 246 may be a button (or other selector, field, icon, or menu item) appearing on an interface configured to allow a user to filter customer information from the interface. For example, the filter button 246 may allow the sales representative 104 to specify filtering criteria that may be used to filter out some or all of the line items 202 displayed on the sales activity interface 102. For example, the sales representative 104 my have hundreds of line items 202 displayed on the sales activity interface 102 on log in. Then, for example, the sales representative 104 may only be interested in viewing those line items 202 associated with customer accounts wherein the customers are based in New York City, to coincide with a business trip the sales representative 104 may be planning. Then, for example, only those line items 202 meeting the filtering criteria may be displayed on the sales activity interface 102. The sales representative 104 may then, for example, specify additional filtering criteria to further filter the already filtered and displayed line items 202. In another example embodiment, the sales representative 104 may filter for an optimal target group of customer accounts for a special marketing campaign the sales representative 104 may be planning. The filtration of the customer accounts based on the filtering criteria may be handled by the filter logic 252.

The filter logic 252 may filter the customer accounts of a sales representative based on a filtering criteria. The filtering criteria may be based on any information accessible by the account value manager 232, including the customer account data 216, the contact data 218, the customer value data 220, and/or the sales data 222. The filter logic 252 may then only provide those customer accounts that meet the filtering criteria (or alternatively, exclude those that do not meet the filter criteria) to the view generator 240. The view generator 240 may then display only those line items 202 associated with customer accounts that meet the filtering criteria.

The sort button 248 may be a button (or selector, field, icon, or menu item) appearing on an interface configured to allow a user to sort the customer information appearing on the interface. For example, the sort button 248 may allow the sales representative 104 to specify sorting criteria that may be used to sort the line items 202 displayed on the sales activity interface 102. For example, the sales representative 104 my have hundreds of line items 202 displayed on the sales activity interface 102. Then for example, the sales representative 104 may only be interested in viewing those line items 202 with the greatest volume of sales over the last two accounting periods (e.g. quarters). Then for example, the line items 202 associated with customer accounts with the greatest volume of sales over the last two quarters may be displayed first, while those customer accounts with the least sales volume over the last two quarters appear near the bottom of the sales activity interface 102. The sales representative 104 may then for example decide to resort the line items 202 based on a different sorting criteria, or may decide to filter the sorted results. The sorting of the customer accounts based on the sorting criteria may be handled by the sort logic 254. In example embodiments, sorting and filtering may be implemented by allowing the sales representative 104 to click on or otherwise select a desired column heading (e.g., "total sales volume") and then to perform filtering/sorting based on the selection and any other provided information.

The sort logic 254 may sort the customer accounts of a sales representative based on a sorting criteria. The sorting criteria may be based on any information accessible by the account value manager 232, including the customer account data 216, the contact data 218, the customer value data 220, and/or the sales data 222. The sort logic 254 may then provide the customer accounts in the order as specified by sorting criteria to the view generator 240. The view generator 240 may then display the line items 202 associated in the order specified by the sorting criteria.

According to an example embodiment, the field selector 242, the classification button 244, the filter button 246, and/or the sort button 248 may be used in conjunction with one another to manage the customer accounts of the sales representative 104. For example, the sales representative may have hundreds of customer accounts appearing in line items 202 on the sales activity interface 202. Then, for example, the sales representative 104 may use the classification button 244 to separate the customer accounts into two categories, such as customers who have had sales in the last 6 months and customers who have not. Then, for example, the classification indicator 214 may indicate those line items 202 associated with customer accounts with sales in the last six months by the color blue, and the rest of the customers with the color red.

Then, for example, the sales representative 104 may use the filter button 246 to filter out those customer accounts that are in red or have sales over the past year of less than $1 million. Then, for example, only those line items 202 associated with customer accounts that have had sales in the past 6 months and sales of $1 million or more over the past year may appear on the sales activity interface 102.

Then, for example, the sales representative 104 may use the sort button 248 to sort the remaining line items 202 with those customer accounts with the oldest last contact appearing first. Then, for example, the sales representative 104, based on the sorted, filtered, and classified line items 202, the sales representative 104 may more easily determine which customer accounts may need to be contacted first, rather than manually examining each of the hundreds of line items 202 that initially appeared on the sales activity interface 102.

Figure 3:
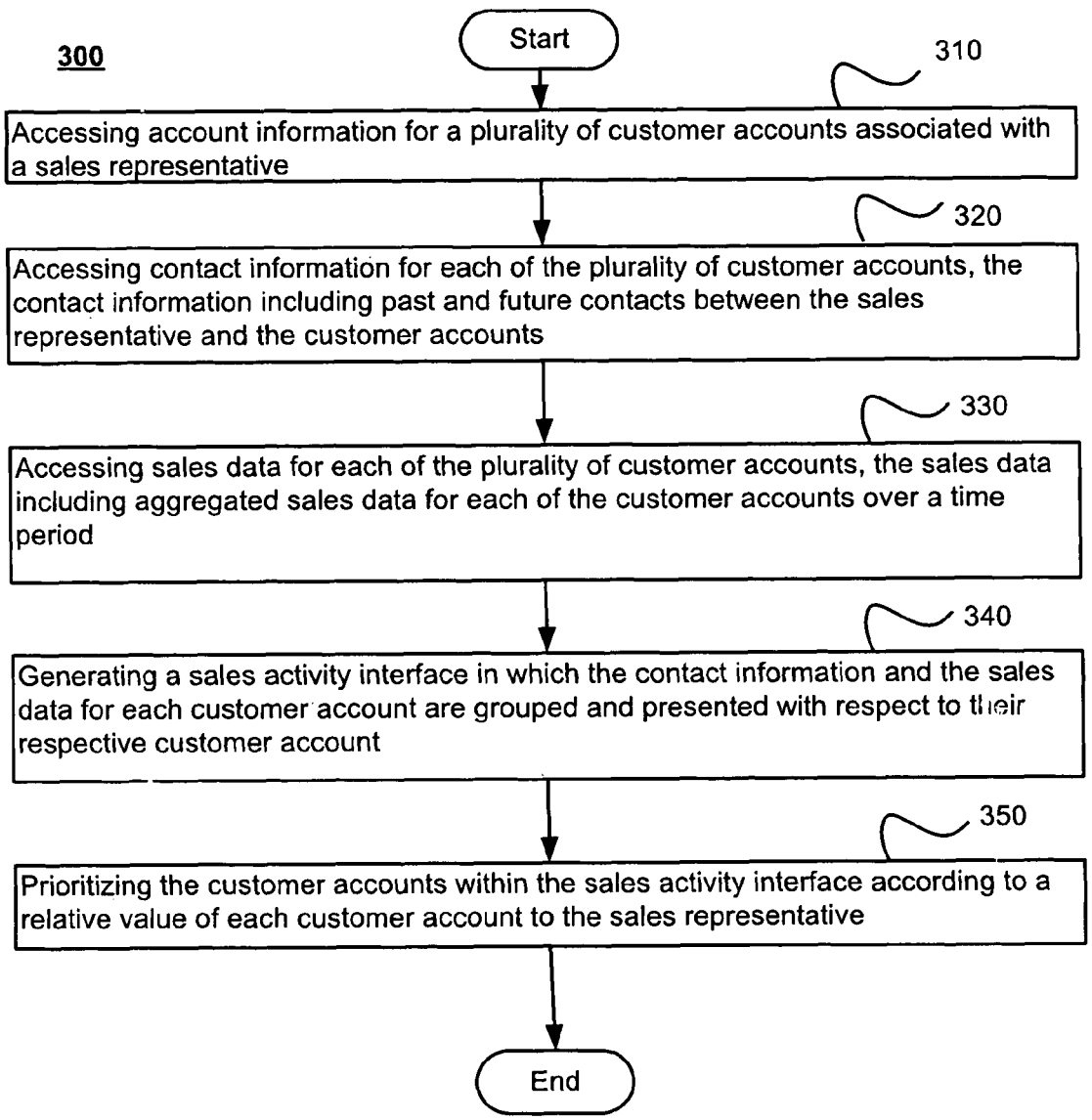
FIG. 3 is a flowchart illustrating example operations of the system of FIG. 2.

FIG. 3 is a flowchart 300 illustrating example operations of the system of FIGS. 1 and 2. More specifically, FIG. 3 illustrates an operational flow 300 representing example operations related to providing and implementing the sales representative workbench 106.

After a start operation, account information for a plurality of customer accounts associated with a sales representative may be accessed (310). For example, as shown in FIG. 2, the account manager 242 may access the customer account data 216, wherein the customer account data may be associated with customer accounts of the sales representative 104.

Then, contact information for each of the plurality of customer accounts may be accessed, the contact information including past and future contacts between the sales representative and the customer accounts (320). For example, the contact manager 226 may access the contact data 218, which may include information about past and future contacts between the sales representative 104 and the customer accounts.

Then, sales data for each of the plurality of customer accounts may be accessed, the sales data including aggregated sales data for each of the customer accounts over a time period (330). For example, the sales manager 234 may access the sales data 222 for each of the customer accounts associated with the sales representative 104. Then, for example, the aggregator logic 238 may aggregate the sales data 222 over a time period.

A sales activity interface may be generated, in which the contact information and the sales data for each customer account are grouped and presented with respect to their respective customer account (340). For example, the view generator 240 may generate the sales activity interface 102, including the line item 202 which may group fields of a related customer account together, including the account fields 204, the contact fields 206, the customer value indication fields 208 and the classification indicator 214.

Then, the customer accounts within the sales activity interface may be prioritized according to a relative value of each customer account to the sales representative (350). For example, the sales activity interface 102 may include multiple line items 202, wherein each line item may correspond to a customer account associated with the sales representative 104. The sales representative 104 may then manage the customer accounts by sorting, filtering, and/or classifying the line items 202 of the sales activity interface 102 using the sort button 248, the filter button 246 and/or the classification button 244, which may cause the line items 202 to be sorted, filtered and/or classified, respectively.

Figure 4:
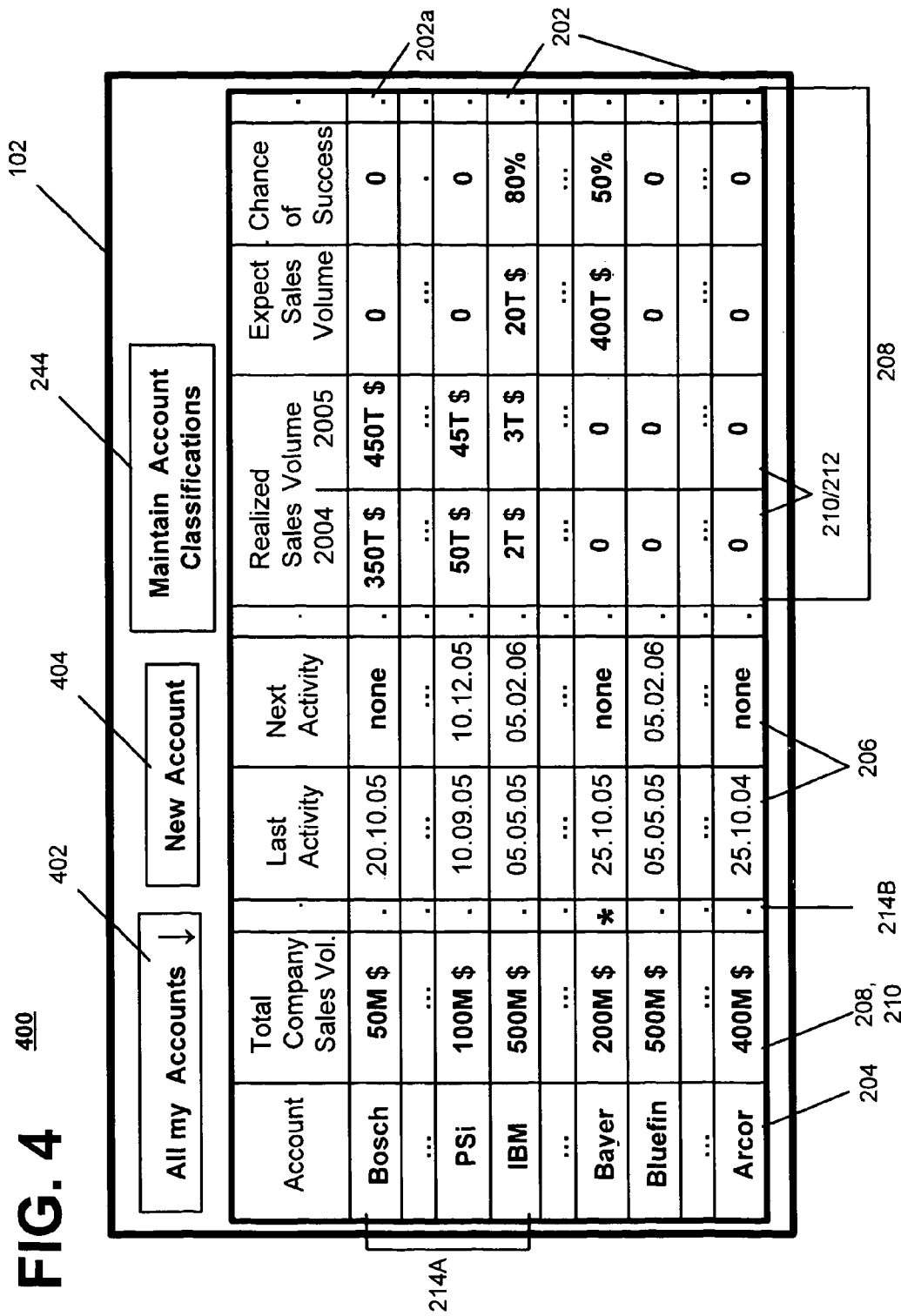
FIG. 4 is a screenshot of the sales activity interface of FIGS. 1 and 2.

FIG. 4 is a screenshot illustrating an example embodiment of the sales activity interface 102 of FIGS. 1 and 2. Thus, the system 400 may include the sales activity interface 102, as operated or used by the sales representative 104. The sales activity interface 102 may include the account field(s) 204. The accounts field 204 may include, for example, an account name field, perhaps in which the account names are provided as hyperlinks to relevant web pages.

The sales activity interface 102 may also include the contact fields 206. The contact fields 206 may include, for example a last activity field and a next activity field which may include information about the last and a next scheduled contact, respectively, between a sales representative and a customer account. In an alternative example embodiment, the contact fields may display the time since (or until) the last or next contact and/or the type of contact. In an example embodiment, the contact fields 206 may be different than those provided in the example of FIG. 4.

The sales activity interface 102 may also include the customer value indication fields 208. The customer value indication fields 208 may include, for example sales fields 210 and/or aggregated information 212. For example, the realized sales volume fields may include sales fields 210, wherein the sales data may be aggregated over a time period (e.g. a year) and presented as aggregated information 212 (e.g. the results of the aggregation).

In another implementation, sales fields 210 may include a total company sales volume field that represents a total sales volume (or other size indicator, such as number of employees) of each customer account, over a relevant time period. Thus, the total company sales volume also may represent an example of the customer value indication fields 208, since, for example, the sales representative 104 may wish prioritize pursuit of larger clients.

In another example embodiment, the customer value indication fields 208 may include any combination of fields displayed on the sales activity interface 102. The customer value indication fields 208 may also include, for example, an expected sales volume field and a chance of success field, which may include forecasted information about potential sales. In an example embodiment, the customer value indication fields 208 may be different than those provided in the example of FIG. 4.

The sales activity interface 102 may also include one or more classification indicators 214A,B. The classification indicators 214A,B may indicate a classification of a customer account as specified by a user or sales representative, or as specified by a sales manager or system administrator. For example, the line items 202 of the classification indicator 214A may all be the color blue to indicate a group of customer accounts with realized sales volume in 2004 of greater than one thousand dollars, wherein the other line items 202 may be white.

In another example embodiment, the classification indicator 214B may be a field of the sales activity interface 102. Then, for example, the classification indicator 214B may indicate zero or more customer accounts that have an expected sales volume of greater than $100 thousand dollars. For example, the Bayer customer account may include classification indicator 214B.

Thus, the classification indicator 214B may include or designate information that is somewhat outside the scope of what is presented within the sales activity interface 102 at a given time. For example, the classification indicator 214B may indicate that a customer has a soon-to-end contract or quotation, or that a sales volume has gone down by some designated amount for a particular customer or time period. In this way, the classification indicator 214B may be used to provide such information, which may be very important with regard to a specific customer, but which may not be widely applicable to a large percentage of customer accounts (and that therefore does not warrant a separate field(s)/column(s) within the sales activity interface 102.

The fields of the sales activity interface 102, including the account fields 204, the contact fields 206, the customer value indication fields 208 and the classification indicator field 214B may all be provided in a grouping, such as the line item 202. The line items 202 may group instances/values of the fields of information together with respect to a customer account. For example, there may be a Bosch line item 202a including information regarding only the Bosch customer account, as shown.

The sales activity interface 102 may also include a drop down action list 402. A drop down action list 402 may include one or more actions that a user may request to manage or adjust the sales activity interface 102. For example, the drop down action list 402 may include an "all my accounts" selection, so that the sales representative 104 may choose to view all available and related customer accounts. The drop down list may include other selections as well, including, for example, predefined sort(s) and/or filter(s). Thus, for example, the sales representative 104 may sort and/or filter the line items 202 of the sales activity interface 102, as described above with respect to the sort button 248 and the filter button 246.

The sales activity interface 102 may also include a new account button 404. The new account button 404 may allow a new customer account line item 202 to be added to the sales activity interface. For example, a user may add a new customer account using the new account button 404, and may enter relevant field information to be displayed in the fields of the customer account line item 202. Then for example, the information entered by the user may be stored by an underlying customer relationship management system so that the next time the user logs into the sales activity interface 102, the new account information will appear.

The sales activity interface 102 may also include a classification button (e.g., "maintain account classifications") 244. The classification button 244, as described above, may allow the sales representative 104 to create, remove, and/or edit existing classifications. For example, a user may change the classification criteria with regards to classification indicator 214A to group only those customer accounts that are located in California. A user may also use classification button 244 to remove the classification indicator field 214B, for example.

The sales activity interface 102 may also include other buttons, selectors, icons, and/or display items that may be used by the sales representative 104 to manage the line items 202 of the sales activity interface 102. Examples of such additional screen elements are provided in more detail herein.

Figure 5:
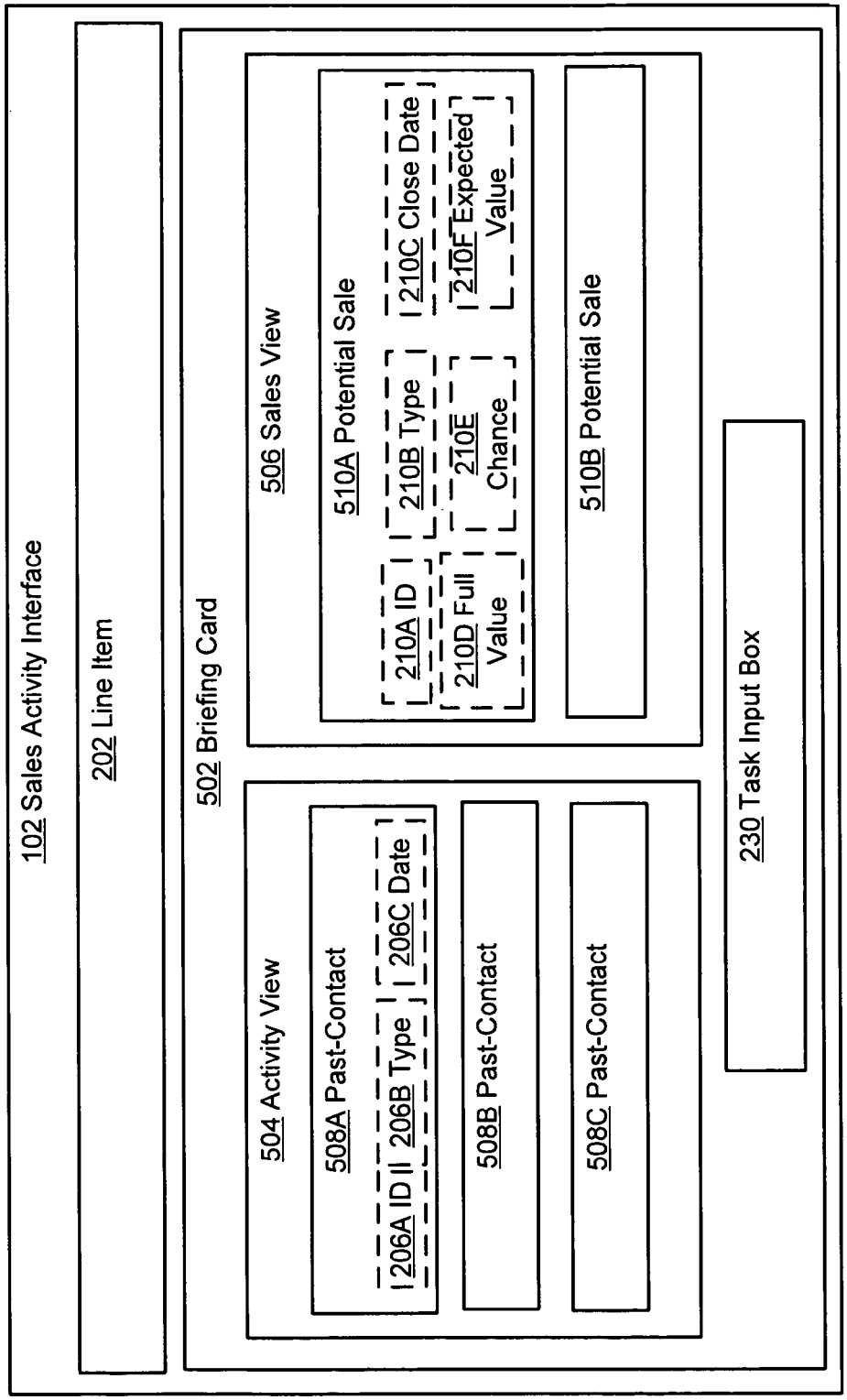
FIG. 5 is a screenshot illustrating examples supplemental features of the sales activity interface of FIG. 4.

FIG. 5 is a screenshot illustrating examples supplemental features of the sales activity interface of FIG. 4. The system 500 may include the sales activity interface 102 operated by a user, for example, a sales manager. The sales activity interface 102 may include the line item 202 related to a customer account of the sales representative 104. The line item 202 may, for example, provide an overview of information with regards to the associated customer account. In an example embodiment, the sales manager may want more information regarding the customer account, for example about the types and dates of the most recent contacts that the sales representative had with the customer account. Then for example, the line item 202 may allow the sales manager to keep the information viewed in a briefing card 502 in context with the information as originally presented.

The briefing card 502 may provide more detailed information regarding any one, or any combination of, fields from the line item 202. The briefing card 502, for example, may be a sub-interface or a pop-up window associated with the sales activity interface 102. In an example embodiment, the briefing card 502 may include an activity view 504 displayed in association with a sales view 504.

The activity view 504 may include detailed information regarding one or more contacts between a sales representative and a customer account. For example, activity view 504 may include multiple past-contacts 508A,B,C between the sales representative and the customer account associated with the line item 202. In another example embodiment, activity view 504 may include different information.

Past-contacts 508A,B,C may each be a grouping of information pertaining to an interaction or contact between a sales representative and a customer account. For example, past-contact 508A may provide information regarding a most recent last contact between a sales representative and the customer account associated with the line item 202. Past-contacts 508B-C may provide information regarding contacts prior to past-contact 508A. A past-contact 508A for example may include multiple contact fields 206A,B,C. For example, past-contact 508A may include a contact ID field 206A, a contact type filed 206B, and a contact date field 206C.

The ID field 206A may for example provide a contact ID for the contact, such as a internal number used to identify the contact amongst multiple contacts. The type field 206B may for example provide the type of contact that occurred. For example, the type field 206B may include an e-mail, telephone, fax, in-person, and/or any other contact or interaction between the sales representative and the customer account. The date field 206C may for example provide the date of the contact.

The sales view 506 may include detailed information regarding sales between the sales representative 104 and a customer account. For example, the sales view 506 may include information on potential or pipeline sales 510A,B between the sales representative and the customer account associated with the line item 202. In another example embodiment, sales view 506 may include different information. For example, the sales view 506 may include information about past sales as well.

Potential sales 510A,B may each be a grouping of information pertaining to a sale or potential sale between the sales representative 104 and a customer account. For example, potential sale 510A may provide information regarding the largest potential or predicted sale between a sales representative and the customer account associated with the line item 202. Potential sale 510B may provide information regarding another potential sale, which, for example, may be for less money than the potential sale 510A. A potential sale 510A for example may include multiple sales fields 210A,B,C,D,E,F.

The ID field 210A may for example provide a sales ID for the sale or potential sales between the sales representative and the customer account, such as a internal number used to identify the sale amongst multiple sales. The type field 210B may for example provide the type of sale that is expected. For example, the type field 210B may include the product or products of interest and/or whether it is a one-time sale or reoccurring sale between the sales representative and the customer account. The close date field 210C may for example provide the expected completion date of the sale. For example, the close date field 210C may provide the date a contract is expected to be signed or a product is expected to be delivered.

The full value field 210D may provide a predicted maximum potential sales value for the sale of potential sale 510A. The chance field 210E may for example provide the expected likelihood of achieving the full value 210D and/or the expected likelihood of achieving any sale from the potential sale 510A. The expected value 210F may provide an expected sales figure (e.g. a sales volume that might be expected to be generated by the sales representative on the potential sale 510A). In an example embodiment, the full value (full value 210D) of the potential sale 510A may be $100 thousand and the chance (chance 210E) of achieving any sale on the potential sale 510A may be 50%. Then, for example, the expected value (expected value 210F) for the potential sale 510A may be $50 thousand.

In an example embodiment, a sales manager may use the briefing card 502 to review customer account and sales information pertaining to the sales representative 104. Upon reviewing the activity view 504 and the sales view 506, the sales manager may, for example, create a task for the sales representative 104 to perform, using the task input box 230. The task may be an action for the sales representative to take regarding the customer account associated with the line item 202. In an example embodiment, the task input box 230 may be a text box where the manager may enter a task and a due date to complete the task. Then, for example, the task may become an action item or potential contact for the sales representative in the sales activity interface 102. In another example embodiment, the sales representative 104 may enter a task for himself.

Although the briefing card 502 provides one example, there may be many other examples as to how the sales representative or other user 104 may navigate to and/or from the sales activity interface 102. For example, as referenced above, the sales representative 104 may navigate to the sales activity interface 102 by way of a homepage that is unique or personalized to the sales representative. The sales activity interface 102 may serve as a portal to more specific account-based information, such as, for example, a more detailed account summary page that provides more information with respect to a specific, selected account.

Figure 6:
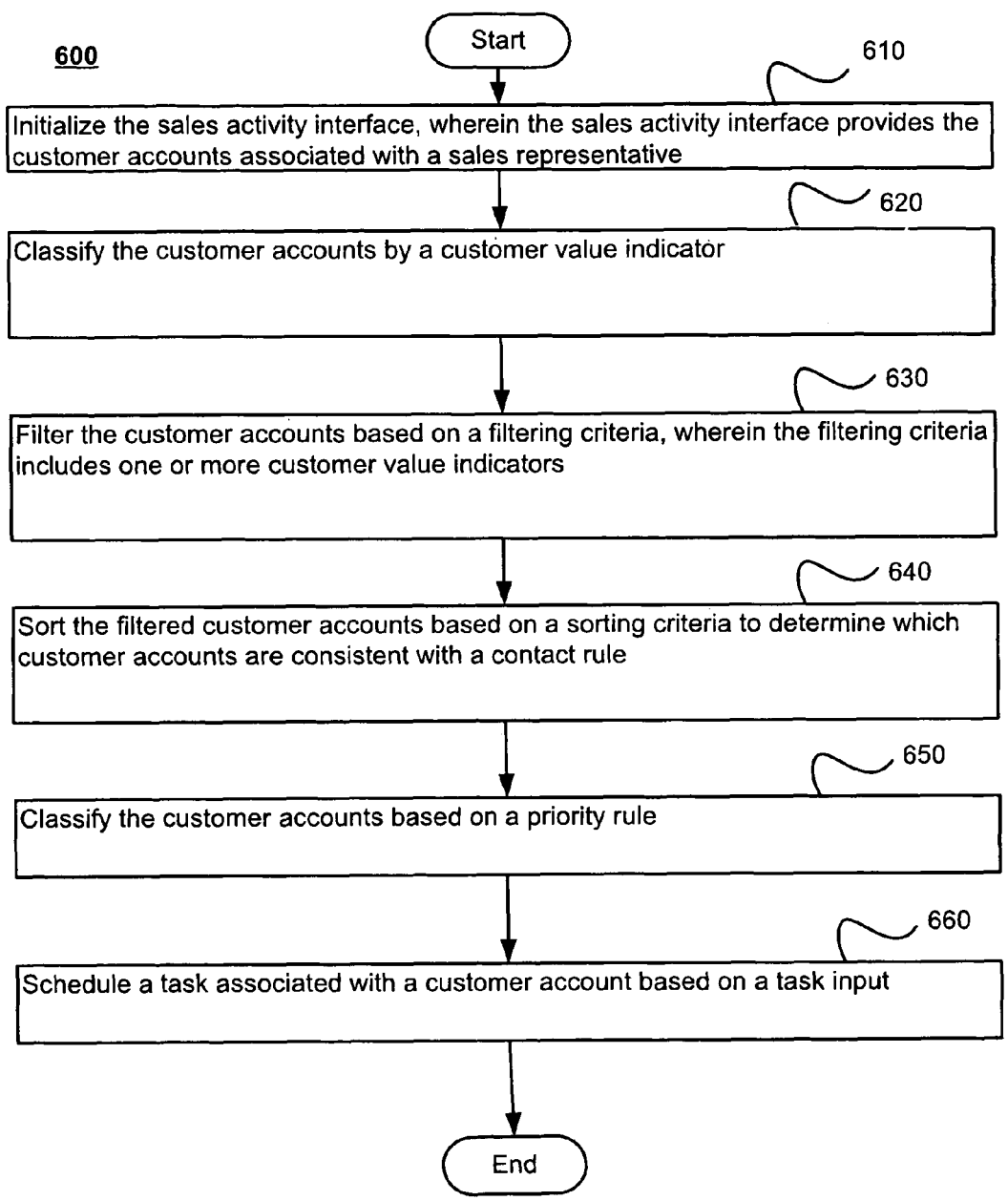
FIG. 6 is a second flowchart illustrating example operations of the system of FIG. 2.

FIG. 6 is a flowchart 600 illustrating example operations of the system of FIG. 2. More specifically, FIG. 6 illustrates an operational flow 600 representing example operations related to providing a sales representative workbench and associated account-based sales activity interface.

After a start operation, a sales activity interface is initialized, wherein the sales activity interface provides the customer accounts associated with a sales representative (610). For example, as shown in FIG. 2, the view generator 240 may receive the customer account data 216, contact data 218, customer value data 220, and sales data 222 from the account manager 242, contact manager 226, and the sales manager 234 and display the data in the sales activity interface 102 according to the default config 244. The data for example, may be provided in the line item 202 which may include account fields 204, contact fields 206, classification indicator 214 and customer value indication fields 208 including sales fields 210 and aggregated information 212. The sales activity interface 102 may include multiple line items 202, wherein each line item 202 may only include customer account information/values/instances for a specific customer account associated with the sales representative 104.

Then, the customer accounts may be classified by a customer value indicator (620). For example, the sales representative 104 may use the classification button 244 to provide a classification criteria. For example, the classification criteria may group the customer accounts into three categories based on sales region. In another example embodiment, there may already exist one or more pre-defined classification criteria. For example, the sales representative 104 may have customer accounts spanning three sales regions, the northeast, mid-Atlantic, and southeast and may wish to have the customer accounts arranged as such. Then for example, the classification logic 250 may apply the classification criteria to the customer accounts, and provide this information to the view generator 240 which may display the classification indicator 214 for the customer accounts of each region. For example, the classification indicator 214 may distinguish the regions by color.

Then, the customer accounts may be filtered based on a filtering criteria, wherein the filtering criteria includes one or more customer value indicators (630). For example, the filter button 246 may accept a filtering criteria from the sales representative 104. For example, the filtering criteria may specify that the only customer accounts of interest are those in the northeast region that had last year sales of greater than $10 thousand. In another example embodiment, there may already exist one or more pre-defined filtering criteria. Then, for example, filter logic 252 may apply the filtering criteria to the customer accounts, and provide this information to the view generator 240 which may update the sales activity interface 102 to include only those line items 202 associated with customer accounts meeting the filtering criteria.

Then, the filtered customer accounts may be sorted based on a sorting criteria to determine which customer accounts are consistent with a contact rule (640). For example, the sort button 248 may accept a sorting criteria from the sales representative 104. Then for example, sort logic 254 may apply the sorting criteria to the customer accounts, and provide this information to the view generator 240 which may update the sales activity interface 102 to include provide the customer accounts in accordance with the sorting criteria. In another example embodiment, there may already exist one or more pre-defined sorting criteria.

In an example embodiment, the sorting criteria may specify to sort the customer accounts to show the customer accounts with the oldest last contact (from contact fields 206) appears first while the most recent last contacts appear last. Then, for example, the sales representative 104 may determine a contact rule that for example states that each of the filtered customer accounts should contacted at least once every 3 months. Then, for example, the sales representative 104 may view the topmost line item 202 to determine when the oldest last contact for the filtered customer accounts was. If, for example, the oldest last contact was 2 months ago, then the sales representative 104 may quickly determine that no new action may be required with any of the filtered customer accounts as they are all consistent with the contact rule.

Then, the customer accounts may be classified based on a priority rule (650). For example, the sales representative 104 may use the classification button 244 to provide a priority rule. For example, the priority rule may specify that those customer accounts with a next contact (of the contact fields 206) scheduled for within the next 3 days are to be prioritized. In another example embodiment, there may already exist one or more pre-defined priority rules. Then, for example, the classification logic 250 may apply the priority rule to the customer accounts, and provide this information to the view generator 240 which may display the classification indicator 214 for the customer accounts which meet the priority rule. For example, the classification indicator 214 may distinguish the prioritized customer accounts with a priority icon.

Then, a task may be scheduled, wherein the task may be associated with a customer account based on a task input (660). For example, a sales manager may assign a task to a sales representative with the task input box 230, where the task may be associated with one or more of the filtered, sorted, and classified customer accounts. The task logic 228 may then process this task and provide it as a scheduled contact through the contact manager 226. The contact manager 226 may then store this information in the contact data 218 and provide it to the view generator 240 which may display the task in the contact fields 206. In an example embodiment, a sales manager may identify a customer account of a sales representative 104 where the sales manager may know a person of interest who the sales representative 104 should talk to. Then for example, the sales manager may assign the sales representative 104 the task to contacting the person of interest within the next 3 days. The task then, for example, may appear as a scheduled contact (in the contact fields 206) for the sales representative 104 using the sales activity interface 102.

Of course, FIG. 6 is merely an illustrative, non-limiting example, and many other such uses, as well as variations thereof, are possible. For example, sorting could be performed prior to filtering, and/or sorting/filtering may occur iteratively.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer program product for handling sales activity information, the computer program product being tangibly embodied on a non-transitory computer-readable storage medium and including computer-executable code that, when executed, is configured to cause a data processing apparatus to provide a sales activity interface comprising:
    a grouped plurality of fields that are grouped with respect to a customer account associated with a sales representative and arranged as a line item interface, the grouped plurality of fields including:
    an account name field configured to identify the customer account;
    a contact field configured to provide contact information associated with a contact between the sales representative and the customer account;
    one or more customer value indication fields configured to provide one or more value metrics associated with the customer account, including determining and displaying using a computer sales data aggregated over a period of time, including one or more of past sales data and projected sales data, and determining and displaying using a computer forecasted chances of success in completing a sale for a corresponding account as calculated using the past sales data and the projected sales data; and
    a classification field configured to provide a classification of only a subset of the accounts and associated line items, the classification including a visual indicator included within each line item of the subset of the accounts.

2. The computer program product of claim 1, wherein the sales activity interface comprises:
    an aggregation of the line items configured to provide aggregated values of one or more of a plurality of the line items and including a plurality of customer accounts.

3. The computer program product of claim 1 wherein the contact field includes:
    a last contact field configured to provide a previous contact between the sales representative and the customer account; and
    a next contact field configured to provide a future contact between the sales representative and the customer account.

4. The computer program product of claim 1, wherein the sales activity interface comprises:
    a plurality of line items, wherein each line item comprises instances of the grouped plurality of fields; and
    a sort selector configured to sort the plurality of line items relative to one another, based on a value of one or more of the instances of the grouped plurality of fields.

5. The computer program product of claim 1, wherein the sales activity interface comprises:
    a plurality of line items, wherein each line item comprises instances of the grouped plurality of fields; and
    a filter selector configured to filter the plurality of line items, based on a value of one or more of the instances of the grouped plurality of fields.

6. The computer program product of claim 1, wherein the sales activity interface comprises:
    a classification indicator configured to indicate a classification of the customer account by providing a visual alteration of at least a portion of the grouped plurality of fields, relative to other customer accounts of the sales activity interface.

7. The computer program product of claim 1, wherein the sales activity interface comprises:
   a field selector configured to receive a selection of the one or more fields, from a plurality of selectable fields.

8. The computer program product of claim 1 wherein the grouped plurality of fields includes:
   one or more account classification fields configured to indicate a classification of one or more customer accounts.

9. A computer-implemented customer relationship management system including computer-executable code recorded on a non-transitory computer-readable storage medium including a customer relationship manager server configured via the computer-executable code to provide a sales workbench system for use by a sales representative, the sales workbench system comprising:
   an account manager configured to access account information for customer accounts associated with the sales representative;
   a contact manager configured to access contact information for each of the customer accounts, the contact information including past and future contacts between the sales representative and the customer account;
   a sales manager configured to access sales data for each of the customer accounts, the sales manager including an aggregator configured to aggregate the sales data for each of the customer accounts over a time period, the sales data including past sales data and projected sales data;
   a view generator configured to generate a sales activity interface in which the contact information and the sales data for each customer account are grouped and presented as a line item of the sales activity interface with respect to their respective customer account;
   a forecast manager configured to compute chances of success in completing a sale for a corresponding account as calculated using the past sales data and the projected sales data, for inclusion of the chances of success within the line item of a corresponding customer account
   classification logic configured to provide a classification of only a subset of the accounts and associated line items, the classification including a visual indicator included within each line item of the subset of the accounts; and
   an account value manager configured to prioritize the customer accounts within the sales activity interface according to a relative value of each customer account to the sales representative.

10. The customer relationship management system of claim 9 wherein the contact manager includes task logic configured to receive input associated with a future contact between the sales representative and a customer account, and to generate a task therefrom.

11. The customer relationship management system of claim 9 wherein the sales manager includes aggregator logic configured to aggregate information over a plurality of customer accounts.

12. The customer relationship management system of claim 11 wherein the sales manager includes comparison logic configured to provide a comparison between forecasted information for the plurality of customer accounts and the aggregated information.

13. The customer relationship management system of claim 9 wherein the sales data includes past and/or anticipated sales between the sales representative and the respective customer account.

14. The customer relationship management system of claim 9 wherein the view generator is configured to generate the sales activity interface as including the sales data aggregated over the time period, wherein the time period is received from the sales representative by way of the sales activity interface.

15. The customer relationship management system of claim 9 wherein the account value manager is configured to prioritize the customer accounts within the sales activity interface relative to one another, by sorting each customer account based on one or more values of the customer account and/or grouped contact information and sales data of each respective customer account.

16. The customer relationship management system of claim 9 wherein the account value manager is configured to prioritize the customer accounts within the sales activity interface by filtering out one or more customer accounts based on one or more values of the customer account and/or grouped contact information and sales data of each respective customer account.

17. The customer relationship management system of claim 9 wherein the account value manager is configured to prioritize the customer accounts within the sales activity interface by associating a priority indicator with a specified group of customer account, contact information, and sales data, and wherein the view generator is configured to recognize the priority indicator and to provide the specified group within the sales activity interface based thereon.

18. The customer relationship management system of claim 9 wherein the view generator is configured to provide a default view configuration, wherein the view generator is configured to provide the sales activity interface based on a default view configuration, wherein the default view configuration is configurable based on a sort, filter, and/or categorization of the customer accounts within the sales activity interface based on one or more values of the customer account and/or grouped contact information and sales data of each respective customer account.

19. A computer-implemented method causing at least one data processing apparatus to provide a sales activity interface, comprising:
   accessing, using the at least one data processing apparatus, account information for a plurality of customer accounts associated with a sales representative;
   accessing, using the at least one data processing apparatus, contact information for each of the plurality of customer accounts, the contact information including past and future contacts between the sales representative and the customer accounts;
   accessing, using the at least one data processing apparatus, sales data for each of the plurality of customer accounts, the sales data including aggregated sales data for each of the customer accounts over a time period, the sales data further including past sales data and projected sales data;
   generating, using the at least one data processing apparatus, the sales activity interface in which the contact information and the sales data for each customer account are grouped and presented as a line item of the sales activity interface with respect to their respective customer account, the line item including chances of success in completing a sale for a corresponding account as calculated using the past sales data and the projected sales data;
   classifying, using the at least one data processing apparatus, only a subset of the accounts and associated line items, including providing a visual indicator included within each line item of the subset of the accounts; and
   prioritizing, using the at least one data processing apparatus, the customer accounts within the sales activity interface according to a relative value of each customer account to the sales representative.

* * * * *